United States Patent

[11] 3,631,589

[72] Inventor William J. Garceau
Reading, Pa.

[21] Appl. No. 879,669
[22] Filed Nov. 25, 1969
[45] Patented Jan. 4, 1971
[73] Assignee Western Electric Company Incorporated
New York, N.Y.

[54] METHOD FOR SEALING GLASS TO METAL
9 Claims, 2 Drawing Figs.

[52] U.S. Cl. .......... 29/588, 65/32, 65/59, 65/DIG. 11
[51] Int. Cl. .......... H01l 1/10, C03c 27/02
[50] Field of Search .......... 65/32, 59, DIG. 11; 29/588

[56] References Cited

UNITED STATES PATENTS 2,279,168 4/1942 Kalischer et al. .......... 65/32
3,490,886 1/1970 Stoll .......... 65/32

*Primary Examiner*—S. Leon Bashore
*Assistant Examiner*—Saul R. Friedman
*Attorneys*—W. M. Kain, R. P. Miller and R. Y. Peters

ABSTRACT: Method of hermetically sealing hard glass to metal as in the encapsulation of a semiconductor device wherein the glass and metal are assembled in loosely fitting relationship and placed in an oven. The assembly is then heated under nonoxidizing conditions at a first pressure. The nonoxidizing atmosphere is then evacuated to produce a second pressure and an oxygen containing gas is then introduced to produce a third pressure and to oxidize the metal when the temperature is increased to the range at which the metal oxidizes. The oxygen-containing atmosphere is then flushed out by introducing a nonoxidizing gas under pressure. The temperature is increased till the glass softens and seals with the metal. The sealed structure is then cooled.

INVENTOR
W.J. GARCEAU
BY R. Y. Peters
ATTORNEY

METHOD FOR SEALING GLASS TO METAL

BACKGROUND OF THE INVENTION

1. Field of the Invention

This invention relates to methods for bonding glass to metal and, more particularly, to improved methods whereby a hermetic seal between metal and hard glass can be obtained. For purposes of illustration, the invention is described herein primarily with regard to the manufacture of electronic components, such as transistors and diodes, although it is to be understood that the invention is not so limited but is meant to include the manufacture of other components or devices in which hermetic seals between metal and glass are required. It is also to be noted that while primary emphasis has been placed upon the use of molybdenum as the metal, the invention may be practiced using other metals, making allowance, however, for their individual optimum oxidation temperatures which are well known or readily determinable by those skilled in the art.

2. Description of the Prior Art

The sealing of glass to metal is a well developed art and is of considerable importance in the manufacture of various electrical devices and components. Hermetic seals have been required, for example, in the manufacture of light bulbs, vacuum tubes, insulators, and, more recently, in the manufacture of diodes and transistors. Quite generally, a metal or metal alloy and a particular glass formulation are selected so as to provide for ease of bonding and to yield desired physical properties. One commonly used combination includes as the metal a cobalt, nickel and iron alloy known as "Kovar" and a comparatively low melting or "soft" glass. For many applications, a package made from these materials is quite satisfactory, but, for rigorous environmental conditions where greater mechanical strength is required or higher operating temperature conditions are encountered, it may be advantageous to use the so-called "hard" glasses that generally have melting points in excess of 700° C.

Also, for reasons which will be discussed more fully below, it is often preferred to use molybdenum rather than Kovar as the metal. For this reason, processes have been devised that enable obtaining excellent hermetic seals between molybdenum and certain hard glasses. The particular hard glasses that are used most successfully contain an oxidizing agent, such as ferric oxide, which, during the glass fusing operation, oxidizes the surface of the molybdenum. Since the sealing of the glass to a metal is essentially a diffusion process in which the metal oxide diffuses into the glass, the oxidizing effect of the ferric oxide contained in the hard glass upon the molybdenum insures the obtaining of uniform and reliable bonds.

The use of hard glass containing ferric oxide suffers from the process disability that temperatures approximating 900° C. must be used to obtain a good seal. This temperature borders on or exceeds the upper limit to which many semiconductor devices can be exposed and, as a result of using such process temperatures, the reliability and function of the semiconductor device may be adversely impaired.

To avoid high-process temperatures while preserving the advantages of using a hard glass, lower melting hard glasses have been formulated which may be fused to metals, and particularly molybdenum, at lower temperatures, e.g., 800° C., which temperatures will not impair the reliability of the semiconductor device. These lower melting hard glasses do not, however, contain ferric oxide or other readily reducible metal oxides, and thus, in order to obtain the necessary bonding between the glass and the metal, it is first necessary to oxidize the surface of the metal as a separate process step. While such a two-step process, i.e., first oxidizing the metal and then fusing the glass and the metal oxide as a separate process step is technically sound, the practical production problems of material handling and the like that arise make such processes undesirable. On the other hand, a one-step method has been suggested wherein the surface of the metal is oxidized immediately prior to the fusion of the hard glass. These one-step methods have proved unsatisfactory due to a lack of reproducibility and the resultant undesirably high reject rate. These one-step processes are in fact so critical that the degree of bonding and the efficiency of the seal is affected by the physical positioning of a given component within a treatment oven.

SUMMARY OF THE INVENTION

Accordingly, it is an object of this invention to provide an improved one-step method for forming a hermetic seal between a metal and a hard glass.

Another object of this invention is to provide a one-step method that reliably and reproducibly will enable obtaining a tight seal between molybdenum and a hard glass.

Another object of this invention is to provide a method for encapsulating semiconductor devices, such as diodes, in order to provide a device of high reliability over a wide range of environmental conditions.

Briefly, these and other objects of this invention are obtained by heating a loose assembly including glass and metal components to temperatures which, in the case of molybdenum, is between about 500° and 650° C., under nonoxidizing conditions; evacuating the atmosphere within the oven when these temperatures are reached; and introducing a partial atmosphere of air into the evacuated oven. After the surface of the metal is oxidized, the air and any oxygen remaining in the oven are purged or flushed from the oven by the introduction and continued flow of a pressurized nonoxidizing gas, such as dry nitrogen. The temperature of the oven is caused to continue to rise until a temperature is reached which is sufficient to cause the glass to fuse to the metal. By these means, in a single unit operation, the metal surface is oxidized by an oxygen-bearing atmosphere and the metal oxide is fused with hard glass under nonoxidizing conditions.

DESCRIPTION OF THE DRAWINGS

The invention can be more fully understood in connection with the following description of the drawings in which.

DETAILED DESCRIPTION

Figure 1:
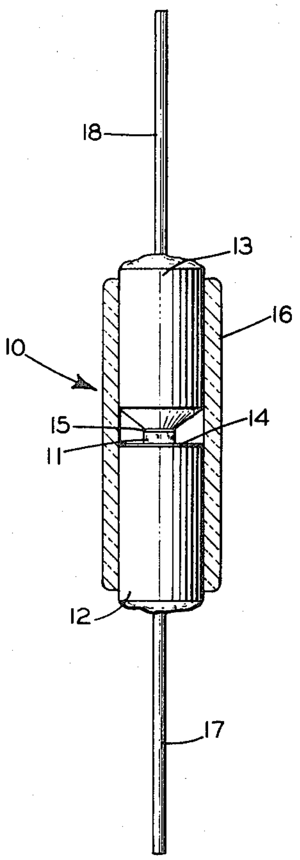
FIG. 1 is a side elevation, partially in section, of a diode manufactured in accordance with this invention.

With respect to FIG. 1, there is shown a diode 10 that contains a chip or wafer 11 comprised of a semiconductive material. The chip 11 is held positioned and in contact with the molybdenum studs 12 and 13. The surfaces of the molybdenum studs 12 and 13 that support the chip 11 are provided with platinum contact surfaces 14 and 15 respectively. The entire structure is surrounded by a glass envelope 16 which holds the components positioned relative to each other, provides mechanical strength to the structure, and hermetically seals the interior from the atmosphere. Conductive lead wires 17 and 18 are secured in electrically conducting relationship with the molybdenum studs 12 and 13 respectively. Preferably, these wires are made from copper-coated nickel/iron alloys such as those sold under the trademark "Dumet."

Figure 2:
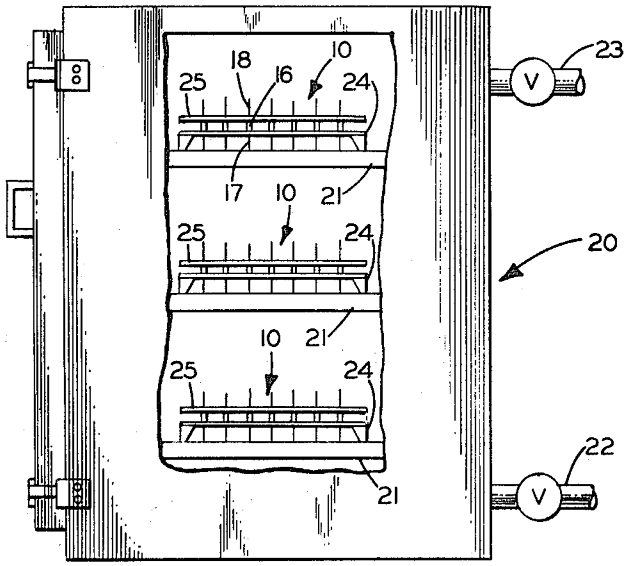
FIG. 2 is schematic illustration, partially broken away, of an oven suitable for use in the practice of this invention.

FIG. 2 illustrates an oven 20 suitable for oxidizing the surface of the molybdenum studs and hermetically sealing the contents of the package. The oven is illustrated with a series of shelves 21—21, a lower valved conduit 22, and an upper valved conduit 23. Resting upon the shelves 21—21 are lower sealing fixtures 24—24 and upper sealing fixtures 25—25. It is the purpose of the sealing fixtures to hold the diodes 10—10 in proper vertical alignment during the heat treatment operation. In order to avoid introducing impurities into the oven and to insure uniformity of temperature throughout, the sealing fixtures advantageously are made of an ultrapure high-density graphite.

Both the lower sealing fixtures 24—24 and the upper sealing fixtures 25—25 are provided with a number of small passageways (not shown) which are adapted to accept the copper lead wires 17 and 18 in order to maintain the diodes in vertical alignment during treatment. While only a few diodes 10—10 are schematically illustrated as being held on the sealing fixtures, it is to be understood that these fixtures are designed to support a much larger number of diodes, for example, about 500, for treatment at a single time.

In operation, the copper lead wire 17 is inserted in one of the lower sealing fixtures 24 to position the molybdenum stud 12 in an upright position. Sleeve 16 is then slid down over the stud 12. Next, the chip or wafer 11 is inserted on top of the stud 12, followed by the insertion of stud 13. When the lower sealing fixture is filled with diodes, the upper sealing fixture 25 is positioned with the lead wires 18 extending through the perforations in this sealing fixture.

The sealing fixtures containing the oriented diodes are placed in the oven 20, the oven is sealed, and all oxidizing gases are flushed from the oven by continuously introducing dry nitrogen gas under pressure via conduit 22 and discharging it via conduit 23.

The temperature of the oven is rapidly increased and, after a given interval of time which is sufficient to enable the temperature to rise to the rapid metal oxidation range which is, in the case of molybdenum, about 480° to 650° C., the nitrogen atmosphere within the oven is evacuated via valved conduit 22 and approximately a 30-inch vacuum of mercury is drawn. A partial atmosphere of air is then introduced via the valved conduit 22 until about 1/3 atmosphere or about 20 inches of mercury is obtained. After a brief detention time within the oven, the air is flushed from the oven by once again establishing the flow of nitrogen under pressure through the oven by introducing it via valved conduit 22 and discharging the contaminated gases via valved conduit 23.

The selection of the temperature at which a vacuum is drawn and air is introduced into the oven is of some importance. On the one hand, it is not desired to oxidize the surface of the molybdenum at temperatures below about 500° C. since the process takes place too slowly at these lower temperatures. On the other hand, in the case of molybdenum, temperatures in excess of 650° C. are not satisfactory due to the fact that at this temperature the rate of sublimation of the oxide layer begins to exceed the rate at which the oxide is formed. The optimum condition for forming the oxide layer has been determined to be about 600° C. and this is the most preferred temperature in the practice of this invention.

As previously noted, dry nitrogen is continuously passed through the oven to flush any oxidizing gases from the oven. Even though some air is introduced into the oven at one stage of the process in order to oxidize the molybdenum studs, any free oxygen that remains in the oven is purged by the introduction and continued flow of dry nitrogen under pressure. This is of considerable importance since only trace amounts, e.g., 10 parts per million, of oxygen can be tolerated within the package.

After the seal has been made, the oven is cooled, partially due to the introduction of dry nitrogen under pressures considerably in excess of those utilized during the fusion step. The result of these pressures is to press the components of the package into intimate contact while the glass is at a temperature sufficiently high to permit plastic flow.

Much of the strength of the package and the physical properties of the diode are developed during the cooling operation. It was mentioned above that there are certain desirable advantages to using molybdenum studs. One of these advantages lies in the fact that the coefficient of thermal expansion of molybdenum is somewhat more than that of the hard glass. This means that when the package is cooled, the glass sleeve 16 contracts at a slower rate than the molybdenum studs 12 and 13. The result is the development of a tensile stress within the glass envelope in the region of the cavity, which is balanced by a compressive stress in the glass along the molybdenum studs 12 and 13 that force them together in secure contacting relationship with the chip 11. By these means, the chip 11 is held securely mounted in electrically contacting relationship with the molybdenum studs 12 and 13.

EXAMPLE

Three sealing fixtures were filled with approximately 480 diodes each in a manner as described above in connection with the description of the drawings and then placed within an oven. The oven was sealed and flushed of any oxidizing atmosphere by flowing dry nitrogen through the oven. The flow of nitrogen was continued through the oven and heating commenced. After a period of about 3 minutes, the oven temperature was rising through the critical oxidation temperature range of from about 480° to 600° C. and the nitrogen was then evacuated from the oven until a vacuum of 30 inches of mercury was obtained. Immediately thereafter, air was introduced into the oven over a period of about 6 to 10 seconds until the gauge indicated about 20 inches of mercury vacuum. After about 15 seconds detention time, dry nitrogen under several atmospheres pressure was introduced into the oven and, at the same time, an exhaust valve was opened to evacuate all residual quantities of oxygen. The temperature continued to rise for another 7 minutes until an ultimate temperature of 800° C. was reached. At this time the discharge valve was closed, high-pressure nitrogen was introduced to compress the package, and further heating was discontinued.

In this example, the glass envelope was comprised of a hard glass having a softening point of approximately 800° C. The glass is a proprietary formulation sold by Corning Glass Company under the trade designation "7061." It is distinguished in that it is an alkali-free glass. Also, it should be noted that, as used herein, the term "hard" glass is also distinguished from "-soft" glass by the higher coefficient of thermal expansion of the hard glass.

To determine the integrity of the diodes made in accordance with this example, the diodes were placed in a very low viscosity liquid (sold under the trade designation "-Zyglo") and submerged for 4 hours in the liquid at 1000 p.s.i. As the Zyglo material will fluoresce under ultraviolet light, any leaks in the package can readily be detected upon inspection.

Over a considerable number of production runs made in accordance with the above example, the reject rate due to poor sealing between the glass envelope and the molybdenum studs was about 0.1 percent. Prior to introduction of this process, a reject rate of from 1 to 3 percent was commonly experienced.

What is claimed is:

1. A method for forming a hermetic seal comprising the successive steps of:

assembling a metal member with a hard glass member free of oxidizing agents;

heating the metal and glass members under nonoxidizing conditions within a pressure vessel at a first pressure while the members are in loosely fitting relationship to each other;

evacuating the atmosphere contained within the vessel to produce a second pressure therein lower than the first pressure and introducing into the vessel a partial atmospheric pressure of oxygen containing gas to produce a third pressure therein higher than the second pressure, when the temperature of the vessel is increasing through the range at which the metal member is readily oxidizable to thereby oxidize the surface of the metal member;

flushing the oxygen containing gas from the vessel by flowing a nonoxidizing gas under pressure through the oven to produce a fourth pressure in the vessel;

continuing to increase the temperature within the vessel until the glass softens and seals with the metal member; and cooling the resultant sealed structure, whereby the metal member and hard glass are hermetically sealed.

2. A method according to claim 1 wherein the metal is molybdenum and the oxygen containing gas is introduced in the temperature range of from 480° to 650° C.

3. A method according to claim 1 wherein the nonoxidizing conditions are established by the continuous flow of dry, oxygen-free nitrogen through the vessel.

4. A method according to claim 1 wherein the gas pressure is increased after the glass softens and such pressure is maintained during the cooling step until the glass hardens.

5. A method according to claim 1 wherein the glass is ferric oxide-free.

6. A method according to claim 1 wherein the glass is alkali-free.

7. A method for encapsulating a semiconductive chip in an hermetically sealed package, comprising the successive steps of:

supporting a first elongated molybdenum stud in an upright position;

sliding a hard glass sleeve down and over the first stud so that a portion of the sleeve extends upward and beyond the upper end of the first stud, the glass sleeve being free of oxidizing agents and alkali and having a coefficient of thermal expansion less than that of the stud;

inserting a semiconductive chip through the upwardly extending portion of the sleeve and on top of the upper end of the first stud;

inserting a second elongated molybdenum stud through the upwardly extending portion of the sleeve and on top of the semiconductive chip to form an assembly of the studs, the sleeve and the chip, the chip being in a cavity formed by the ends of the studs and the sleeve, the studs and sleeve being in loosely touching relationship with each other, the coefficient of thermal expansion of the second stud being the same as that of the first stud;

placing the assemblage in a pressure oven and establishing a continuous flow of dry, nitrogen free gas through the oven to produce a first pressure therein;

increasing the temperature of the oven from room temperature;

interrupting the flow of nitrogen, evacuating the atmosphere of the oven to produce a second pressure therein lower than the first pressure and introducing an oxygen-containing gas into the oven to produce a third pressure in the oven while the temperature is rising through the range of from 480° to 600° C. to thereby oxidize the surface of the molybdenum studs and immediately thereafter flushing the oxidizing atmosphere from the oven by reestablishing a continuous flow of dry, oxygen-free nitrogen through the oven to produce a fourth pressure therein;

continuing to increase the temperature of the oven to a temperature in excess of 700° C. and at which the glass sleeve softens;

increasing the pressure of the nitrogen gas to produce a fifth pressure in the oven above that of the gases within the assemblage when that temperature above 700° C. at which the glass sleeve softens is reached to thereby seal the glass sleeve to the studs and encapsulate the chip in an hermetically sealed package; and cooling the package to develop a tensile stress within the glass sleeve in the region of its cavity to force the studs together in secure contacting relationship with the chip.

8. A method according to claim 7 wherein the device is a diode.

9. A method according to claim 7 wherein the glass softens at about 800° C.

* * * * *

L-566-PT
(6-69)

UNITED STATES PATENT OFFICE
CERTIFICATE OF CORRECTION

Patent No. 3,631,589 Dated January 4, 1972

Inventor(s) William J. Garceau

It is certified that error appears in the above-identified patent and that said Letters Patent are hereby corrected as shown below:

On the introductory page:

Change "Patented January 4, 1971" to read --Patented January 4, 1972--.

Signed and sealed this 30th day of May 1972.

(SEAL)
Attest:

EDWARD M.FLETCHER,JR.
Attesting Officer

ROBERT GOTTSCHALK
Commissioner of Patents